United States Patent
Kleen et al.

(10) Patent No.: US 9,950,711 B2
(45) Date of Patent: Apr. 24, 2018

(54) DEVICE FOR A VEHICLE

(71) Applicant: VOLKSWAGEN AKTIENGESELLSCHAFT, Wolfsburg (DE)

(72) Inventors: Andro Kleen, Braunschweig (DE); Helge Schäfer, Braunschweig (DE); Daniel Ricknäs, Stockholm (SE); Marc-Michael Meinecke, Sassenburg (DE); Pär Degermann, Oxelösund (SE)

(73) Assignee: Volkswagen AG (DE)

( * ) Notice: Subject to any disclaimer, the term of this patent is extended or adjusted under 35 U.S.C. 154(b) by 42 days.

(21) Appl. No.: 15/026,613

(22) PCT Filed: Sep. 30, 2014

(86) PCT No.: PCT/EP2014/070931
§ 371 (c)(1),
(2) Date: Apr. 1, 2016

(87) PCT Pub. No.: WO2015/049235
PCT Pub. Date: Apr. 9, 2015

(65) Prior Publication Data
US 2016/0244071 A1   Aug. 25, 2016

(30) Foreign Application Priority Data

Oct. 1, 2013 (DE) .................. 10 2013 110 867

(51) Int. Cl.
*B60W 50/14* (2012.01)
*B60K 35/00* (2006.01)
(Continued)

(52) U.S. Cl.
CPC ............. *B60W 50/14* (2013.01); *B60K 35/00* (2013.01); *B60W 30/12* (2013.01); *B60W 30/16* (2013.01); *G08G 1/015* (2013.01); *G08G 1/165* (2013.01); *G08G 1/166* (2013.01); *B60K 2350/1076* (2013.01); *B60W 2050/146* (2013.01)

(58) Field of Classification Search
CPC ...... B60W 50/14; B60W 30/12; B60W 30/16; B60W 2050/146; G08G 1/166; G08G 1/015; G08G 1/165; B60K 35/00; B60K 2350/1076
See application file for complete search history.

(56) References Cited

U.S. PATENT DOCUMENTS 8,346,426 B1 * 1/2013 Szybalski ............ B60W 50/14
701/25

FOREIGN PATENT DOCUMENTS

DE   19821163 A1   11/1999
DE   10007501 A1   9/2001
(Continued)

OTHER PUBLICATIONS

Search Report for International Patent Application No. PCT/EP2014/070931; dated Mar. 11, 2015.

*Primary Examiner* — Mussa A Shaawat
*Assistant Examiner* — Michael V Kerrigan
(74) *Attorney, Agent, or Firm* — Barnes & Thornburg LLP

(57) ABSTRACT

A device having a sensor, a control unit, and a display designed for a vehicle which is designed as an at least partially self-driving vehicle. The sensor detects objects in the surroundings of the vehicle. The device displays the objects, together with the vehicle, on the display in animated form.

11 Claims, 1 Drawing Sheet

(51) Int. Cl.
*B60W 30/12* (2006.01)
*B60W 30/16* (2012.01)
*G08G 1/015* (2006.01)
*G08G 1/16* (2006.01)

(56) References Cited

FOREIGN PATENT DOCUMENTS

| | | |
|---|---:|---|
| DE | 10336638 A1 | 2/2005 |
| DE | 102009048954 A1 | 4/2011 |
| DE | 102009052773 B3 | 4/2011 |
| DE | 202011001909 U1 | 4/2012 |
| DE | 102012210145 A1 | 12/2012 |
| DE | 102011082375 A1 | 3/2013 |
| DE | 102011082475 A1 | 3/2013 |
| EP | 1442918 A2 | 8/2004 |
| EP | 1947623 A1 | 7/2008 |

\* cited by examiner

DEVICE FOR A VEHICLE

PRIORITY CLAIM

This patent application is a U.S. National Phase of International Patent Application No. PCT/EP2014/070931, filed 30 Sep. 2014, which claims priority to German Patent Application No. 10 2013 110 867.9, filed 1 Oct. 2013, the disclosures of which are incorporated herein by reference in their entirety.

FIELD

Illustrative embodiments relate to a device for a vehicle which is designed for at least partially automatic driving.

SUMMARY

The automatic driving of a vehicle in a traffic jam permits the driver to dedicate himself to secondary activities while he is seated on the driver's seat. In this context, the driver must, on the one hand, be able to estimate realistically the capabilities and properties of the vehicle driving automatically, to be able to adapt his behavior correspondingly. On the other hand, the driver must be able to estimate correctly the situation of the vehicle driving automatically, to be able to react quickly and appropriately in the event of the driving function being returned to the driver.

Illustrative embodiments assist the driver in this context.

BRIEF DESCRIPTION OF THE FIGURES

Disclosed embodiments will be described in detail with respect to the figures.

DETAILED DESCRIPTION OF THE DISCLOSED EMBODIMENTS

Figure 1:
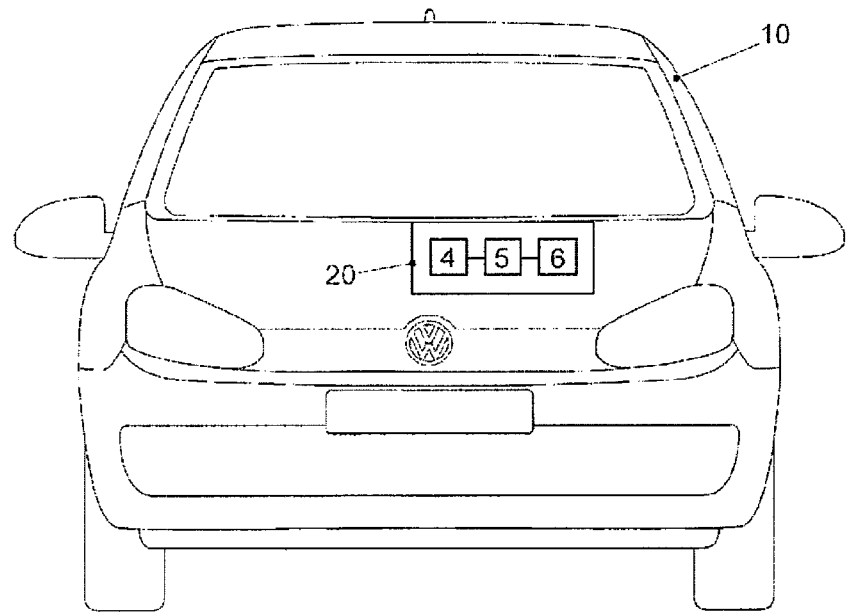
FIG. 1 illustrates a display which shows the vehicle in question together with surrounding vehicles.

Within the scope of the disclosed embodiments, a device for a vehicle is made available, wherein the vehicle is designed for at least partially automatic driving. In this context, the device comprises a sensor, a controller and a display. The sensor is designed to detect objects in the surroundings of the vehicle. The device is designed to display these objects, together with the vehicle, in an animated form on the display.

The vehicle is able to drive automatically (i.e., without any activation on the part of a person) under certain conditions (for example in a traffic jam on the freeway). If these conditions are not satisfied, the vehicle can be driven quite normally in a manual fashion by the driver. According to the disclosed embodiments, the sensor of the device can also be a plurality of sensors of different type (for example a stereo camera, a radar and an ultrasonic sensor). Furthermore, the device can be designed to receive and/or transmit Car2X data.

The animated representation of the objects in the surroundings of the vehicle together with the vehicle in question on the display (for example the combination display of the vehicle) assists the driver in detecting rapidly the current situation of his vehicle.

In particular, the disclosed device is designed to detect an automatic driving state in which the vehicle is driven automatically. In this context, the objects, together with the vehicle in question, are displayed on the display (only) in the automatic driving state.

In particular in the automatic driving state, the driver can easily be distracted. Therefore, the disclosed embodiments provide the possibility, particularly in the automatic driving state, of informing the driver rapidly and comprehensively about the current driving situation in the surroundings of his vehicle.

The disclosed device is designed to classify the objects detected in the surroundings of the vehicle on the basis of outputs by the sensor. As a result, any object illustrated on the display can be displayed in accordance with its class in such a way that it can be differentiated from objects of another class on the display.

Since the objects on the display can be differentiated in terms of their class by the driver, the rapid provision of information about the current driving situation is improved further.

In this context, the classes into which each displayed object is classified comprise at least two classes which originate from a set of classes which itself comprises the following classes:

A passenger car (PKW). This is understood to be a motor vehicle for conveying persons, which motor vehicle is designed to convey not more than 9 (5) persons.

A van. This is understood to be a motor vehicle with a bodywork raised in comparison with a normal passenger car.

A truck (LKW).

A fixed obstacle, for example a tree or a building in the vicinity of the road.

A road sign.

A bridge.

A tunnel.

The more classes the objects displayed on the screen are divided into, the more accurately the current driving situation can be displayed to the driver. However, it must be ensured that the degree of detail (i.e., the number of classes) does not become too large, since it otherwise becomes impossible for the driver to perceive the driving situation rapidly. The division into the classes of passenger car, truck and van is carried out here, for example, on the basis of the size of the respective vehicle detected by the sensor of the device.

Furthermore, the sensor can be used to detect additional information on the objects, with the result that, with respect to selected objects of those displayed on the display, in each case one or more of these additional information items relating to the corresponding object can be displayed on the display.

By means of this additional information which is displayed, for example, on request by activating a corresponding operator control element for the selected object, the driving situation can be represented and assessed by the driver even better.

In this context, the respective additional information can correspond to an additional information item from the following set of additional information:

A current speed of a moving object (in particular of a vehicle).

A current differential speed between the moving object and the vehicle.

The dimensions (i.e., length, width and/or height) of the moving object.

Information as to whether the displayed object (for example a vehicle but also a road sign) has operationally capable Car2X technology.

A road width of the road currently being driven on by the vehicle, wherein, in particular, the width of the road at the narrowest point in a section of road ahead of the vehicle is of interest. In this context, a road width is also understood to mean narrowing of the road by road signs or trees.

A height of a passage through a bridge or a tunnel which is also displayed as a correspondingly classified object on the display.

The additional information can also comprise a warning if, for example, a road width undershoots a critical dimension.

In particular, the device is designed to identify at least one of the objects displayed on the display as what is referred to as a target object and to represent this target object differently from the other objects displayed on the display. In this context, a target object is understood to be an object which is the cause or the reason for a driving maneuver of the vehicle which is currently being carried out or is to be carried out in the near future.

Since the respective target object is indicated on the display, a corresponding, automatically executed driving maneuver by the vehicle (for example an avoidance maneuver) can be followed better by the driver.

Furthermore, it is possible to display the objects (in particular the vehicles) on a specific lane next to the current lane of the vehicle, abstracted as a graphic representation on the display. In this context, the graphic representation comprises information about traffic on the specific lane. The information corresponds here to an information item from the following set of information:

A speed at which the vehicles on the specific lane are moving on average.

A degree of density which indicates how many vehicles are located on the specific carriageway per unit length.

Instead of individual objects (vehicles), in this disclosed embodiment a highly abstracted representation is given on the display, which representation no longer allows the individual vehicles to be recognized. Instead, the corresponding lane is colored according to the information or is represented as a pattern. In this way, the dynamics of the adjacent lane (i.e., a lane next to the current lane of the vehicle) can be displayed and clarified. On the basis of the graphic representation, the driver can, for example, perceive a high average speed of the vehicles on the adjacent lane or a comparatively high number of vehicles on the adjacent lane (high degree of density) better than if individual objects are represented with additional information on the adjacent lane.

According to a further disclosed embodiment, the sensor (or a specific sensor) of the device is able to detect availability information. The device is able here to display this availability information on the display. In this context, the availability information corresponds to an item of availability information from the following set of availability information which itself comprises:

Information about the availability of a mobile radio network at the current location of the vehicle.

Information about the availability of a WLAN network at the current location of the vehicle.

Information about the availability of Car2X data at the current location of the vehicle. This is to be understood as, in particular, the availability of Car2X technology in the surroundings of the route which is currently being driven on by the vehicle.

As a result of the representation of the corresponding availability information, the driver can estimate well how well the automatic driving is supported in the corresponding situation. For example, in regions with a high level of availability improved navigation or even video telephony can be offered. As a result of the representation of the availability information, the driver is occupied to a greater degree with driving-related content and is therefore more aware of the current situation of the automatically driven vehicle.

The availability information can be represented here by means of one or more symbols on the display or abstractly as a graphic representation on at least one region of the display.

For example, data density can be provided through corresponding variation of the coloring in the surroundings of the vehicle (for example green for a high data density) on the display. If a specific network or the Car2X data is not available this can be displayed by a corresponding symbol on the display.

Within the scope of the disclosed embodiments, a vehicle can also be made available which comprises the disclosed device.

Disclosed embodiments assist the driver during the detection of the driving situation of his automatically driving vehicle by representing important target objects, the dynamics of the surroundings of the vehicle and further properties of the surroundings in an animated representation and in relation to the vehicle in question. As a result, the driver is enabled to obtain an overview of the direct surroundings of his vehicle and the properties thereof with little effort, to acquire appropriate awareness of the situation. Furthermore, the disclosed embodiments enable the driver to check the reliability of a system for automatically driving a vehicle. The target objects and surrounding objects which are represented on the display can easily be compared with the reality by the driver, as a result of which the driver can better estimate the performance capability of the system and therefore establish an appropriate level of trust in the system.

Within the scope of the disclosed embodiments, it is also possible to make available a mobile device which comprises the disclosed device.

Such a mobile device could comprise optical or acoustic sensors or retrieve data from a server by radio communication, to detect, evaluate and display objects in the surroundings of the mobile device (for example in the context of a navigation application running on the mobile device).

Disclosed embodiments are suitable, in particular, for motor vehicles. Of course, the disclosed embodiments are not restricted to this application range, since the disclosed embodiments can also be used for rail-guided or track-mounted vehicles as well as for water vessels or aircraft. However, the disclosed embodiments could also be used in a mobile device outside of means of transportation, as described above.

The display 6 illustrated in FIG. 1 shows the vehicle 10 in question together with vehicles 1, 2 in the surroundings of the vehicle 10 in question in an animated form. In the present case, leading vehicle 1 and vehicles 2 are illustrated on the lane adjacent to the lane of the vehicle 10 in question. Furthermore, in each case additional information (here the speed of the respective vehicle) is illustrated for the vehicles 1, 2 in the surroundings of the vehicle 10 in question. This additional information can be displayed or removed from the display at the driver's request (for example by activating the "right-hand arrow" and "left-hand arrow" pushbutton keys on the steering wheel).

Figure 2:
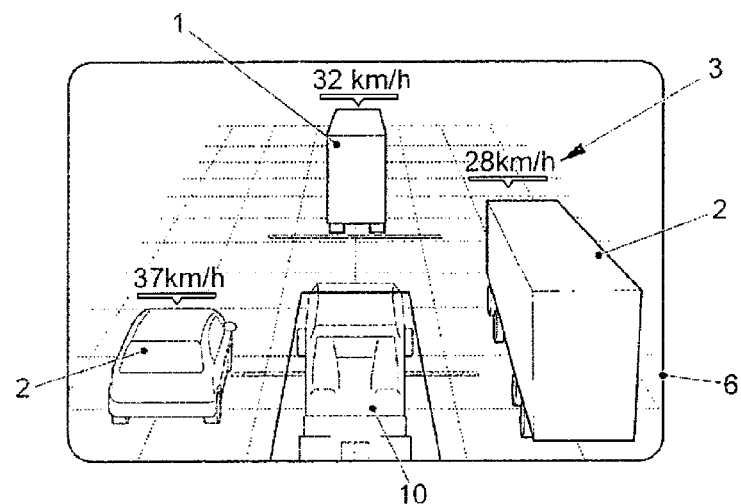
FIG. 2 illustrates a vehicle with the disclosed device.

FIG. 2 illustrates a vehicle 10 which comprises a device 20 and which is designed for automatic driving. In this context, the device 20 comprises for its part a sensor 4, a controller 5 and a display 6. Objects 1, 2 in the surroundings of the vehicle 10 can be detected with the sensor. The device 20 is able to represent these objects detected by the sensor, together with the vehicle 10, in animated form on the display 6.

DE 100 07 501 A1 discloses the detection and monitoring of a multiplicity of vehicles driving ahead. In this context, the course, speed and/or distance from the vehicle in question are respectively determined for the vehicles driving ahead and as a function thereof the vehicle in question is adapted in terms of its instantaneous speed.

LIST OF REFERENCE NUMBERS

1 Leading vehicle
2 Vehicle on adjacent lane
3 Additional information
4 Sensor
5 Controller
6 Display
10 Vehicle
20 Device

The invention claimed is:

1. A device for a vehicle designed for at least partially automatic driving, the device comprising:
   a sensor;
   a controller; and
   a display,
   wherein the sensor detects objects in the surroundings of the vehicle,
   wherein the device displays the objects, together with the vehicle, in an animated form on the display,
   wherein the device identifies one of the objects displayed on the display as a target object, wherein the target object constitutes a cause of an automatically executed driving maneuver of the vehicle, and
   wherein the device displays the target object so that the target object is represented differently from the other objects of a same class on the display.

2. The device of claim 1, wherein the device detects an automatic driving state in which the vehicle drives automatically, and displays, in the automatic driving state, the objects, together with the vehicle, in an animated form on the display.

3. The device of claim 1, wherein the device classifies the objects as a function of outputs of the sensor, and displays each object in its class so that the object can be differentiated from other classes on the display.

4. The device of claim 3, wherein the class of each displayed object corresponds to one of at least two classes from a set of classes, wherein the set of classes comprises:
   a passenger car;
   a van;
   a truck;
   a fixed obstacle;
   a road sign;
   a bridge; and
   a tunnel.

5. The device of claim 1, wherein the device detects additional information relating to the objects by the sensor and displays on the display, at least one of the additional information items relating to at least one of the displayed objects.

6. The device of claim 5, wherein the additional information for each displayed object corresponds to an additional information item from a set of additional information, wherein the set of additional information comprises:
   a current speed of a moving object;
   a current differential speed between a moving object and the vehicle;
   the length, width and/or height of a moving object;
   information as to whether the corresponding object has operationally capable Car2X technology;
   a road width; and
   a height of a passage through a bridge or a tunnel.

7. The device of claim 1, wherein the device displays the objects on a specific lane which is adjacent to a current lane of the vehicle, abstracted as a graphic representation of a specific roadway, wherein the graphic representation of the specific roadway comprises information about traffic on the specific roadway, and
   wherein the information corresponds to an information item from a set of information, wherein the set of information comprises:
      a speed at which the vehicles on the specific lane are moving, and
      a degree of density which indicates how many vehicles are located on the specific roadway per unit length.

8. The device of claim 1, wherein the device displays the vehicle in an animated form on the display.

9. A device for a vehicle designed for at least partially automatic driving, the device comprising:
   a sensor;
   a controller; and
   a display,
   wherein the sensor detects objects in the surroundings of the vehicle,
   wherein the device displays the objects, together with the vehicle, in an animated form on the display,
   wherein the sensor detects availability information, wherein the device displays the availability information on the display, and
   wherein the availability information corresponds to an item of availability information from a set of availability information, wherein the set of availability information comprises:
      information about the availability of a mobile radio network for the vehicle,
      information about the availability of a WLAN network for the vehicle, and information about the availability of Car2X data for the vehicle.

10. The device of claim 9, wherein the device displays the availability information as at least one symbol on the display or abstractly as a graphic representation of at least one region of the display.

11. The device of claim 9, wherein the device detects an automatic driving state in which the vehicle drives automatically, and displays, in the automatic driving state, the objects, together with the vehicle, in an animated form on the display.

* * * * *